(12) United States Patent
Rider et al.

(10) Patent No.: US 10,496,148 B2
(45) Date of Patent: Dec. 3, 2019

(54) CONTEXT-BASED INDOOR POWER MANAGEMENT

(71) Applicants:Tomer Rider, Naahryia (IL); Rachel Cohen, Haifa (IL)

(72) Inventors: Tomer Rider, Naahryia (IL); Rachel Cohen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/038,673

(22) PCT Filed: Dec. 24, 2013

(86) PCT No.: PCT/US2013/077658
§ 371 (c)(1),
(2) Date: May 23, 2016

(87) PCT Pub. No.: WO2015/099700
PCT Pub. Date: Jul. 2, 2015

(65) Prior Publication Data
US 2016/0291671 A1    Oct. 6, 2016

(51) Int. Cl.
*G06F 1/26*    (2006.01)
*G06F 1/3206*    (2019.01)
(Continued)

(52) U.S. Cl.
CPC .......... *G06F 1/3206* (2013.01); *G06F 1/3209* (2013.01); *G06F 1/3231* (2013.01);
(Continued)

(58) Field of Classification Search
CPC .............. G06F 1/3206; G06F 1/3209
(Continued)

(56) References Cited

U.S. PATENT DOCUMENTS 8,898,496 B1 *    11/2014    Chi ................. G06F 1/3206
                                                                 455/574
9,692,611 B1 *    6/2017    Tom .................... H04L 12/2697
(Continued)

FOREIGN PATENT DOCUMENTS

CN        103282854 A    9/2013

OTHER PUBLICATIONS

International search report for PCT application No. PCT/US2013/077658, dated Sep. 22, 2014 (3 pages).
(Continued)

*Primary Examiner* — Volvick Derose
(74) *Attorney, Agent, or Firm* — Barnes & Thornburg LLP

(57) ABSTRACT

Technologies for managing power consumption include a power management device that determines a context associated with a user of computing devices located within a building and in communication with the power management device. The power management device compares the context associated with the user to a power management policy. The power management policy includes power management rules that define power consumption levels for the computing devices based on the context associated with the user. The power management device communicates with the computing devices to adjust the power consumption levels in response to the context associated with the user satisfying a power management rule.

23 Claims, 7 Drawing Sheets

(51) Int. Cl.
  *H02J 13/00* (2006.01)
  *G06F 1/3209* (2019.01)
  *H04L 12/28* (2006.01)
  *G06F 1/3231* (2019.01)
  *H04L 12/24* (2006.01)

(52) U.S. Cl.
  CPC .......... *H02J 13/00* (2013.01); *H02J 13/0006* (2013.01); *H04L 12/2827* (2013.01); *H04L 41/0833* (2013.01); *Y02B 70/325* (2013.01); *Y02B 70/3216* (2013.01); *Y02D 10/173* (2018.01); *Y04S 20/221* (2013.01); *Y04S 20/228* (2013.01); *Y04S 40/162* (2013.01)

(58) Field of Classification Search
  USPC .......................................................... 713/320
  See application file for complete search history.

(56) References Cited

U.S. PATENT DOCUMENTS

| | | | |
|---|---|---|---|
| 2003/0135769 A1* | 7/2003 | Loughran | G06F 1/3203 713/310 |
| 2007/0006098 A1* | 1/2007 | Krumm | G06F 17/3087 715/825 |
| 2008/0005381 A1* | 1/2008 | Theocharous | G06F 1/3203 710/18 |
| 2009/0287948 A1* | 11/2009 | Chary | G06F 1/3203 713/324 |
| 2010/0305773 A1 | 1/2010 | Cohen | |
| 2010/0073169 A1* | 3/2010 | Needham | A61J 7/0481 340/573.1 |
| 2010/0114389 A1* | 5/2010 | Chatterton | G06F 1/3203 700/291 |
| 2010/0161706 A1* | 6/2010 | Kim | G05B 15/02 709/202 |
| 2012/0005490 A1 | 1/2012 | Goraczko et al. | |
| 2012/0065802 A1* | 3/2012 | Seeber | G06F 1/3203 700/295 |
| 2012/0151055 A1 | 6/2012 | Kansal et al. | |
| 2012/0173908 A1* | 7/2012 | Chakra | G06F 1/3206 713/323 |
| 2012/0197449 A1 | 8/2012 | Shin et al. | |
| 2012/0212668 A1* | 8/2012 | Schultz | H04N 5/23206 348/468 |
| 2013/0217332 A1* | 8/2013 | Altman | H04H 60/90 455/41.2 |
| 2014/0004799 A1* | 1/2014 | Masuda | H04W 52/0225 455/41.2 |
| 2014/0095617 A1* | 4/2014 | Chan | H04L 67/1097 709/204 |
| 2014/0334271 A1* | 11/2014 | Park | G04G 21/04 368/10 |
| 2015/0056920 A1* | 2/2015 | Huttunen | H04B 7/26 455/41.2 |
| 2015/0148964 A1* | 5/2015 | Schultz | G05D 23/1905 700/276 |

OTHER PUBLICATIONS

Written opinion for PCT application No. PCT/US2013/077658, dated Sep. 22, 2014 (9 pages).
Notice of Preliminary Rejection for Korean Patent Application No. 9-5-2017-021842528, dated Mar. 27, 2017, 9 pages.
European Search Report for Patent Application No. 13900028.5-1879, dated Jul. 10, 2017, 8 pages.
First Office Action dated Sep. 29, 2017 for Chinese Patent Application No. 201380081142.9 with translation, 26 pages.
Second Office Action dated May 9, 2018 for Chinese Patent Application No. 201380081142.9, 10 pages.
Office action in Indian patent application No. 201647015206, dated Dec. 26, 2018 (7 pages).
Office action in European patent application No. 13900028.5, dated Jan. 9, 2019 (5 pages).
Third Office action in Chinese patent application No. 201380081142.9, dated Oct. 24, 2018, including translation (21 pages).
Decision of rejection in Chinese patent application No. 201380081142.9, dated Apr. 10, 2019 (20 pages).

\* cited by examiner

CONTEXT-BASED INDOOR POWER MANAGEMENT

CROSS REFERENCE TO RELATED APPLICATIONS

This application is a national stage entry under 35 USC § 371(b) of International Application No. PCT/US2013/077658, which was filed Dec. 24, 2013.

BACKGROUND

Modern consumer electronic devices such as laptops, desktops, mobile computing devices, televisions, audio devices, and video devices have become ubiquitous with everyday life so much so that it is not uncommon for a person to interact with a large number of such devices throughout the day. As a result, consumer electronic devices are increasingly finding their way into consumers' homes. However, as the number of consumer electronic devices within a home grows so too does the energy costs associated with operating those devices. The increased presence of consumer electronic devices within the home also hinders the implementation of an increasing number of "green initiatives."

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
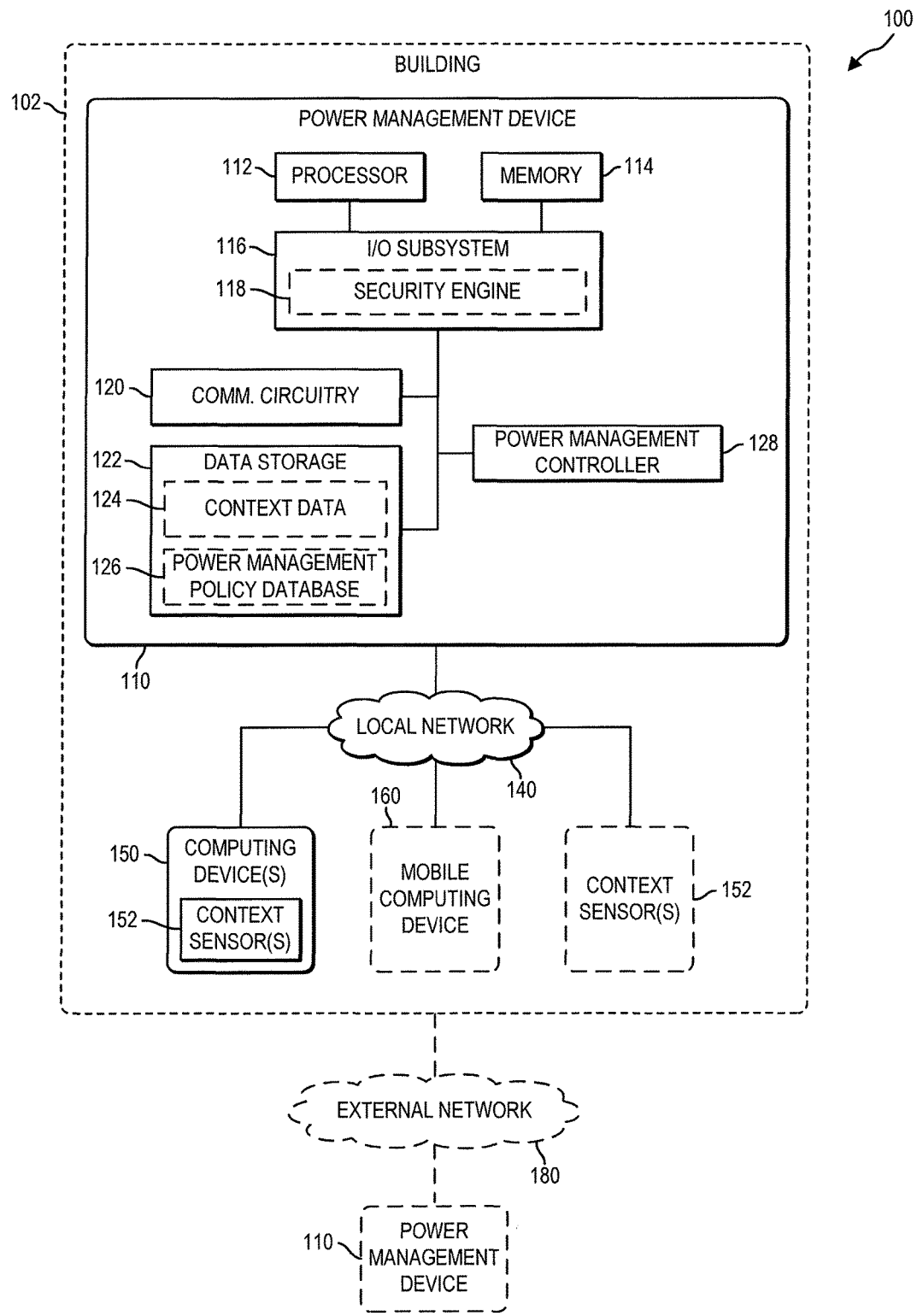
FIG. 1 is a simplified block diagram of at least one embodiment of a system for managing power consumption levels of computing device(s)

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for managing power consumption levels within a building 102 (e.g., a residence or business) includes a power management device 110 and one or more computing devices 150, which communicate with each other over a local network 140. In use, the power management device 110 controls the power consumption level of one or more of the computing devices 150 based at least in part on, or otherwise as a function of, a context associated with one or more users of the computing devices 150. To do so, the power management device 110 is configured to determine the context associated with the user based on context data 124 captured by one or more context sensors 152 of the computing device(s) 150 and/or one or more context sensors 152 communicatively coupled to the power management device 110. The power management device 110 compares the context associated with the user to a power management policy, which includes power management rules that define power consumption levels for the computing device(s) 150 based on the context. In response to the context associated with the user satisfying one or more of the power management rules, the power management device 110 communicates with one or more of the computing devices 150 to adjust the power consumption levels of those computing device(s) 150.

In some embodiments, the power management device 110 is located in the building 102 and is configured to communicate with the computing device(s) 150 via the local network 140. In other embodiments, the power management device 110 may be located external to or otherwise remote from the building 102. In such embodiments, the power management device 110 may be configured to communicate with the computing device(s) 150 via an external network 180. As discussed below, the power management device 110 may also be configured to transmit a notification to one or more of the computing device(s) 150 and/or a mobile computing device 160 of the user. Additionally, the building 102 may be embodied as any structure or area in which the computing device(s) 150 may be located. For example, in some embodiments, the building 102 may be embodied as a house or a residence of the user(s) of the computing device(s) 150.

The power management device 110 may be embodied as, or otherwise include, any type of computing device capable of performing the functions described herein including, but not limited to a server computer, a desktop computer, a laptop computing device, a smart television, a smart appliance, a home automation gateway device, a programmable logic controller, a consumer electronic device, a wireless access point, a network switch, a network router, a mobile computing device, a mobile phone, a smart phone, a tablet computing device, a personal digital assistant, and/or other type of computing device. The illustrative power management device 110 includes a processor 112, a memory 114, an input/output (I/O) subsystem 116, communication circuitry 120, a data storage 122, and a power management controller 128. Of course, the power management device 110 may include other or additional components, such as those commonly found in a computer (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 112 in some embodiments.

The processor 112 may be embodied as any type of processor capable of performing the functions described herein. For example, the processor 112 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the power management device 110 such as operating systems, applications, programs, libraries, and drivers. The memory 114 is communicatively coupled to the processor 112 via the I/O subsystem 116, which may be embodied as circuitry and/or components to facilitate input/output operations with the processor 112, the memory 114, and other components of the power management device 110. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 116 may form a portion of a system-on-a-chip (SoC) and be incorporated, along with the processor 112, the memory 114, and other components of the power management device 110, on a single integrated circuit chip.

In some embodiments, the I/O subsystem 116 may include a security engine 118, which may be embodied as an embedded microprocessor, such as a security co-processor, that operates independently of the processor 112 to provide a secure and isolated environment that cannot be accessed by the processor 112 or other components of the power management device 110. In such embodiments, the security engine 118 may manage the storage of one or more encryption keys used by the power management device 110 to secure data and/or communications between the power management device 110 and the computing device(s) 150 and/or the mobile computing device 160. In such embodiments, the one or more encryption keys may be stored in a portion of memory 114 that is accessible to the security engine 118 and inaccessible to other components of the power management device 110. In other embodiments, the security engine 118 may include internal or local secured memory, separate from the memory 114, in which the encryption keys may be stored. It should be appreciated that the security engine 118 may also securely store other types of data in the portion of memory 114 that is accessible to the security engine 118 and inaccessible to other components of the power management device 110. Additionally, the security engine 118 may, in some embodiments, function in an operational power state while the processor 112 and other components of the power management device 110 are in a low-power state (e.g., sleep, hibernate, etc.) or are powered-down.

The communication circuitry 120 of the power management device 110 may be embodied as any type of communication circuit, device, or collection thereof, capable of enabling communications between the power management device 110 and the computing device(s) 150, the mobile computing device 160, and/or other computing devices. The communication circuitry 120 may be configured to use any one or more communication technologies (e.g., wireless or wired communications) and associated protocols (e.g., Ethernet, Wi-Fi®, WiMAX, etc.) to effect such communication.

The data storage 122 may be embodied as any type of device or devices configured for short-term or long-term storage of data such as, for example, memory devices and circuits, memory cards, hard disk drives, solid-state drives, or other data storage devices. In some embodiments, the data storage 122 may be configured to store context data 124 indicative of a context associated with the user of the one or more of the computing devices 150. For example, in some embodiments, the context data 124 may include context data indicative of the current location of the user (e.g., a room within the building 102, a distance between the user and one or more of the computing devices 150, etc.). Additionally or alternatively, the context data 124 may include context data indicative of an activity of the user (e.g., watching television, taking a nap, interacting with one or more of the computing devices 150, talking on the phone, reading a book, etc.). The stored context data 124 may also include historical context data associated with a past context of the user of the computing device(s) 150. The data storage 122 may also be configured to store a power management policy database 126. The power management policy database 126 may include one or more power management policies that define global (e.g., system-wide) power consumption goals and/or targets to be achieved by the computing device(s) 150. For example, each power management policy may include one or more power management rules that define a power consumption level for one or more of the computing devices 150 based on the context associated with the user. Additionally or alternatively, the power management rules may also define reference power conditions and/or reference power thresholds that if satisfied, cause the power management device 110 to adjust (e.g., increase, decrease, etc.) the power consumption level of one or more of the computing devices 150.

As discussed above, the power management device 110 may communicate with the computing device(s) 150 and the mobile computing device 160 over the local network 140 and/or the external network 180. The networks 140, 180 may be embodied as any number of various wired and/or wireless communication networks. For example, the networks 140, 180 may be embodied as or otherwise include a local area network (LAN), a personal area network (PAN), a wide area network (WAN), a cellular network, or a publicly-accessible, global network such as the Internet. Additionally, the networks 140,180 may include any number of additional devices to facilitate communication between the power management device 110, the computing device(s) 150, the mobile computing device 160, and other devices of the system 100 as discussed below.

The computing device(s) 150 may be embodied as any type of computing device or processing device capable of communicating with the power management device 110 and performing the functions described herein including, but not limited to, a desktop computer, a laptop computing device, a smart television, a smart appliance, a consumer electronic device, a mobile computing device, a mobile phone, a smart phone, a tablet computing device, a personal digital assistant, an audio device, a server computer, a lighting control device, a thermostat, motorized window coverings, and/or other type of computing device. As such, the computing device(s) 150 may include devices and structures commonly found in computing devices such as processors, memory devices, communication circuitry, and data storages, which are not shown in FIG. 1 for clarity of the description. As discussed in more detail below, the power consumption level of the computing device(s) 150 may be controlled by the power management device 110 and/or the mobile computing device 160. For example, in some embodiments, the computing device(s) 150 may receive a power control instruction and/or a power management policy update from the power management device 110. In such embodiments, each computing device 150 receiving such instructions and/or updates may adjust its own power consumption level.

Additionally, the computing device(s) 150 may be configured to transmit context data to the power management device 110. To do so, in some embodiments, the computing device(s) 150 include one or more context sensors 152 configured to capture context data associated with one or more users of the computing device(s) 150. The context sensor(s) 152 may be embodied as any type of device or devices configured to capture context data indicative of a context of one or more users of the computing device(s) 150. As such, the context sensor(s) 152 sense characteristics of the user and/or information corresponding to the operating environment of the computing device(s) 150. For example, in some embodiments, the context sensor(s) 152 may be embodied as, or otherwise include, one or more biometric sensors configured to sense physical attributes (e.g., facial features, speech patterns, retinal patterns, etc.), behavioral characteristics (e.g., eye movement, visual focus, body movement, etc.), and/or expression characteristics (e.g., happy, sad, smiling, frowning, sleeping, surprised, excited, pupil dilation, etc.) of one or more users of the computing device(s) 150. In some embodiments, the context sensor(s) 152 may also include or be embodied as one or more camera sensors (e.g., cameras) configured to capture digital images and/or video of one or more users of the computing device(s) 150. For example, the context sensor(s) 152 may be embodied as one or more still camera sensors (e.g., cameras configured to capture still photographs) and/or one or more video camera sensors (e.g., cameras configured to capture moving images in a plurality of frames). In such embodiments, the digital images captured by the one or camera sensors may be analyzed to detect one or more physical attributes, behavioral characteristics, and or expression characteristics of one or more users of the computing device(s) 150. Additionally, the context sensor(s) 152 may be embodied as, or otherwise include, one or more environment sensors configured to sense environment data corresponding to the operating environment of the computing device(s) 150. For example, in some embodiments, one or more of the context sensor(s) 152 include environment sensors that are configured to sense and generate weather data, ambient light data, sound level data, location data, and/or time data corresponding to the operating environment of the computing device(s) 150. It should be appreciated that the context sensor(s) 152 may also be embodied as, or otherwise include, any other type of sensors including functionality for capturing context data 124 indicative of the context of the user(s) of the computing device(s) 150. Additionally, although the computing device(s) 150 include the one or more context sensors 152 in the illustrative embodiment, it should be understood that all or a portion of the context sensors 152 may be separate from the computing device(s) 150 in other embodiments.

In some embodiments, the system 100 may also include a mobile computing device 160, which may communicate with the power management device 110 over the local network 140 and/or the external network 180. The mobile computing device 160 may be embodied as any type of computing device capable of performing the functions described herein including, but not limited to, a mobile phone, a smart phone, a tablet computing device, a personal digital assistant, a wrist-based computing device, a smart watch, an optical head-mounted display, a consumer electronic device, a laptop computing device, a desktop computer, and/or other type of computing device. As such, the mobile computing device 160 may include devices and structures commonly found in computing devices such as processors, memory devices, communication circuitry, and data storages, which are not shown in FIG. 1 for clarity of the description. In some embodiments, the mobile computing device 160 is configured to communicate with the power management device 110, the computing device(s) 150, and/or any other computing device of the system 100. In some embodiments, the mobile computing device 160 may receive one or more notifications (e.g., global power status information, power management alert(s), power management notification(s), etc.) from the power management device 110 as discussed in more detail below. The mobile computing device 160 may also be configured to control the power management device 110 and/or the computing device(s) 150 via communications sent by a remote control interface (e.g., a graphical user interface, a command line interface, etc.) of the mobile computing device 160. Additionally, in some embodiments, the mobile computing device 160 may function as one of the computing devices 150 under certain circumstances or during certain time periods (e.g., during times in which the mobile computing device 160 is not being operated by the user).

Figure 2:
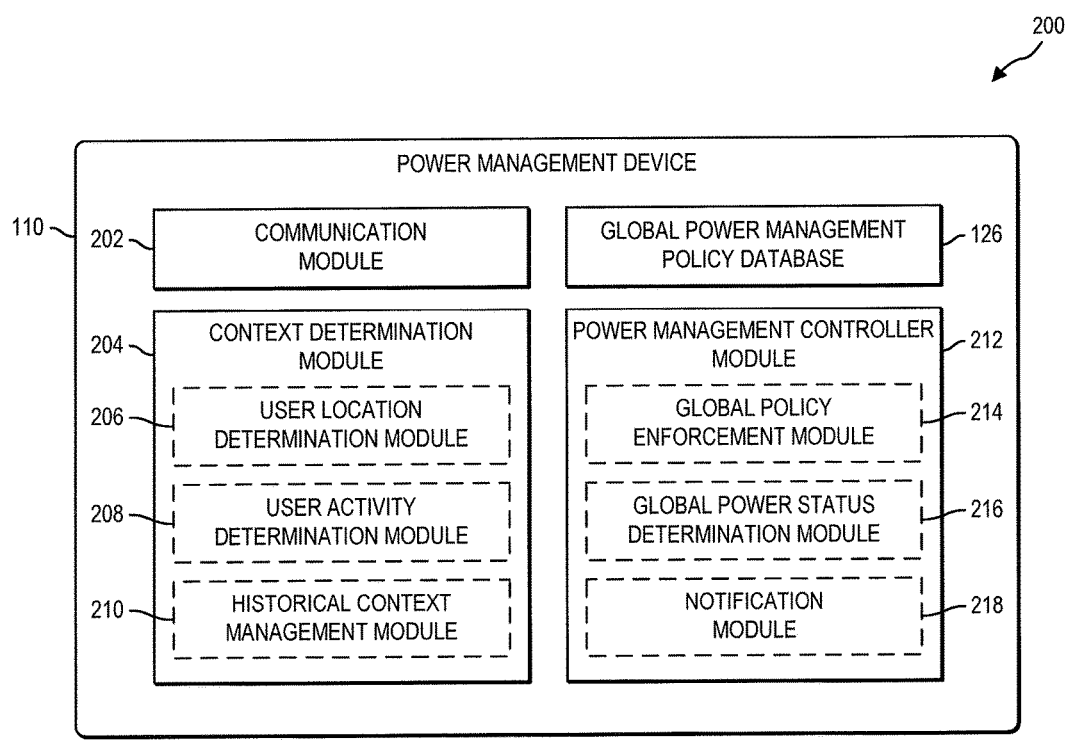
FIG. 2 is a simplified block diagram of at least one embodiment of an environment of the power management device of FIG. 1.

Referring now to FIG. 2, in use, the power management device 110 establishes an environment 200 during operation. The illustrative environment 200 includes a communication module 202, a context determination module 204, a power management controller module 212, and the global power management policy database 126. As discussed in more detail below, the context determination module 204 may include a user location determination module 206, a user activity determination module 208, and a historical context management module 210. In some embodiments, the power management controller module 212 may also include a global policy enforcement module 214, a global power status determination module 216, and a notification module 218. Each of the modules 202, 204, 206, 208, 210, 212, 214, 216, 218, and 126 of the environment 200 may be embodied as hardware, software, firmware, or a combination thereof. It should be appreciated that the power management device 110 may include other components, sub-components, modules, and devices commonly found in a computing device, which are not illustrated in FIG. 2 for clarity of the description.

The communication module 202 of the power management device 110 facilitates communications between components or sub-components of the power management device 110 and the computing device(s) 150 and/or the mobile computing device 160. For example, in some embodiments, the communication module 202 may facilitate sending (e.g., transmitting) a power control instruction and/or a power management policy update to the computing device(s) 150. In some embodiments, the communication module 202 may also facilitate sending (e.g., transmitting) one or more notifications (e.g., global power status data, power management alert(s), power management notification(s), etc.) to the computing device(s) 150 and/or the mobile computing device 160.

The context determination module 204 is configured to determine the context of the user of the computing device(s) 150. To do so, the context determination module 204 may analyze the context data 124 received from the computing device(s) 150 and/or stored in the data storage 122 (e.g., historical context data). As discussed, the context data 124 may be captured by the context sensor(s) 152 of the computing device(s) 150 and may be indicative of the context of one or more users within the building 102. In use, the context determination module 204 may analyze the context data 124 to determine a current location of the user(s) within the building 102 and/or a current activity of the user(s) (e.g., watching television, taking a nap, interacting with one or more of the computing devices 150, talking on the phone, reading a book, etc.). It should be appreciated that any other context of the user(s) of the computing device(s) 150 may be determined by the power management device 110 based on the context data 124 received from the computing device(s) 150. Additionally or alternatively, the context determination module 204 may analyze context data 124 received directly (e.g., via the local network 140 and/or the external network 180) from one or more context sensors 152 located external to the computing device(s) 150. For example, in some embodiments, the context determination module 204 analyze user presence context data (e.g., a detected level of carbon dioxide, a detected change in ambient temperature, a detected heart rate, a detected blood pressure, a detected blood oxygen level, a detected breathing pattern, a detected sound pattern, etc.) received from one or more context sensors 152 (e.g., a motion sensor, a breathing detection sensor, a heart rate sensor, a microphone, a biometric sensor, etc.) located external to or otherwise separate from the computing device(s) 150.

As discussed, the context determination module 204 may analyze the context data 124 to determine the location of the user(s) within the building 102. To do so, in some embodiments, the context determination module 204 may include the user location determination module 206. In such embodiments, the user location determination module 206 is configured to determine a current location (e.g., a room, floor, area, etc.) of the user(s) within the building 102 based at least in part on, or otherwise as a function of, the context data 124. For example, the user location determination module 206 may analyze context data 124 received from a smart television located in the master bedroom of a house. The received context data 124 may include presence data indicative of a particular user (e.g., a parent, a child, a homeowner, etc.) being present (e.g., located) within the master bedroom. In another example, the user location determination module 206 may analyze context data 124 received from a desktop computer located in a home office. In such examples, the received context data 124 may be indicative of one or more users being present (e.g., located) within the home office. It should be appreciated that the user location determination module 206 may analyze any type of context data 124 received from any number of computing device(s) 150 in one or more locations (e.g., rooms, floors, areas, etc.) of the building 102 to determine the current location of the user(s).

The context determination module 204 may also analyze the context data 124 to determine the current activities of the user(s) within the building 102. To do so, in some embodiments, the context determination module 204 may include the user activity determination module 208. In such embodiments, the user activity determination module 208 is configured to determine a current activity (e.g., watching television, taking a nap, interacting with one or more of the computing devices 150, operating a different computing device 150, talking on the phone, reading a book, etc.) of the user(s) within the building 102 based at least in part on, or otherwise as a function of, the context data 124. For example, the user activity determination module 208 may analyze context data 124 (e.g., motion data, breathing pattern data, etc.) received from a smart television and determine that the user of the smart television is asleep. In another example, the user activity determination module 208 may analyze context data 124 (e.g., user interaction data, keystroke input data, web browser history, social media posts, etc.) received from a laptop computer and determine that the user is currently interacting with the laptop computer. It should be appreciated that the user activity determination module 208 may analyze any type of context data 124 received from any number of computing device(s) 150 to determine the current activity of the user(s).

In some embodiments, the context determination module 204 also manages historical context data 124. In such embodiments, the context determination module 204 may include the historical context management module 210. The historical context management module 210 is configured to compare the current context associated with the user(s) with historical context data associated with the user(s). In some embodiments, the historical context management module 210 may determine that the current activity associated with the user(s) matches or is otherwise substantially similar to a previously established contextual pattern based on the comparison. For example, based on the historical context data associated with a particular user, the historical context management module 210 may determine that the user typically watches the morning news on a smart television located in the master bedroom on weekdays. If the context determination module 204 (via the user activity determination module 208) determines that the user is currently watching the smart television in the master bedroom on a Friday morning, the historical context management module 210 may determine that the current context associated with the user matches or is substantially similar to the previously established contextual pattern. In some embodiments, the historical context management module 210 may determine instead that the current activity associated with the user(s) differs from a previously established contextual pattern based on the comparison. For example, the context determination module 204 (via the user activity determination module 208) may determine that the user is currently watching the smart television in the basement on a Friday morning, the historical context management module 210 may determine that the current context associated with the user differs from the previously established contextual pattern of the user typically watching the weekday morning news on the smart television located in the master bedroom. As such, the historical context management module 210 may be configured to update (e.g., revise, replace, etc.) the previously established contextual pattern and/or establish (e.g., generate, create, etc.) a new contextual pattern as a function of the differences.

As discussed, the global power management policy database 126 may include one or more power management policies that define global (e.g., system-wide) power consumption goals and/or targets to be achieved by the computing device(s) 150. Each power management policy may include one or more power management rules that define a power consumption level for one or more of the computing devices 150 based on the context associated with the user. The power management policies and/or the power management rules may be used by the power management device 110 to adjust the power consumption level for one or more of the computing devices 150 based on the context associated with the user(s).

The power management controller module 212 is configured to control the power consumption levels of one or more of the computing devices 150 based on the context associated with the one or more users. To do so, the power management controller module 212 may include the global policy enforcement module 214. The global policy enforcement module 214 may be configured to compare the context associated with the user to the power management policies of the global power management policy database 126. As discussed, each power management policy may include one or more power management rules that define a power consumption level for one or more of the computing devices 150 based on the context associated with the user. As such, the global policy enforcement module 214 may be configured to determine whether one or more of the power management rules are satisfied based on the current context associated with the user. In response to determining that at least one of the power management rules is satisfied, the global policy enforcement module 214 may determine that the power consumption level of one or more of the computing devices 150 should be adjusted (e.g., increased, decreased, etc.) to achieve a defined or reference power consumption level.

The global policy enforcement module 214 may also be configured to control (e.g., adjust) the power consumption level of one or more of the computing devices 150 based on comparing the current context associated with the user to one or more power management policies. That is, as a function of determining that at least one of the power management rules is satisfied based on the context associated with the user, the global policy enforcement module 214 may be configured to control the power consumption level of the computing device(s) 150. To do so, in some embodiments, the global policy enforcement module 214 may transmit a power control instruction to one or more of the computing devices 150. For example, the global policy enforcement module 214 may transmit a shutdown instruction (e.g., an instruction to cause the computing device 150 to shut down and/or power down), a boot instruction (e.g., an instruction to cause the computing device 150 to boot and/or power up), a wake instruction (e.g., an instruction to cause the computing device 150 to wake up from a sleep state), a sleep or hibernate instruction (e.g., an instruction to cause the computing device 150 to go to sleep and/or hibernate), a processor clock rate control instruction (e.g., an instruction to cause the computing device 150 to increase and/or decrease processor frequency), and/or a processor core control instruction (e.g., an instruction to cause the computing device 150 to enable and/or disable one or more processor cores) to one or more of the computing devices 150. In such embodiments, the computing devices 150 may execute the received power control instruction and thereby adjust their own power consumption level. It should be appreciated that any other type of power control instruction may be transmitted to the computing devices 150 by the global policy enforcement module 214.

Additionally or alternatively, the global policy enforcement module 214 may transmit a power management policy update to one or more of the computing devices 150 to control (e.g., adjust) the power consumption level. The power management policy update may include one or more updated power management rules that define a revised power consumption level for the computing device(s) 150. As discussed in more detail below, the computing devices 150 may implement the received power management policy update (e.g., apply the power management policy update to local power management policies of a local power management policy database).

In some embodiments, the global policy enforcement module 214 may also be configured to update one or more of the power management policies based on changes to an existing contextual pattern of the user and/or or in response to generation of a new contextual pattern of the user. For example, in embodiments wherein the historical context management module 210 determines that the current context of the user differs from a previously established contextual pattern, the global policy enforcement module 214 may update (e.g., revise, adjust, etc.) a power management policy based on, or otherwise as a function of, the differences. Thereafter, the global policy enforcement module 214 may transmit a power management policy update to the computing devices 150 based on the revised power management policy.

The power management controller module 212 is also configured to determine the global (e.g., system-wide) power status of the computing device(s) 150. To do so, in some embodiments, the power management controller module 212 includes the global power status determination module 216. In such embodiments, the global power status determination module 216 may be configured to receive local power status data from each of the one or more computing devices 150. The received local power status data may include a current power consumption level and/or a current power state (e.g., powered-on, powered-off, sleeping, hibernating, waking, booting, suspended, etc.) for the computing device 150 from which it was received.

Figure 7A:
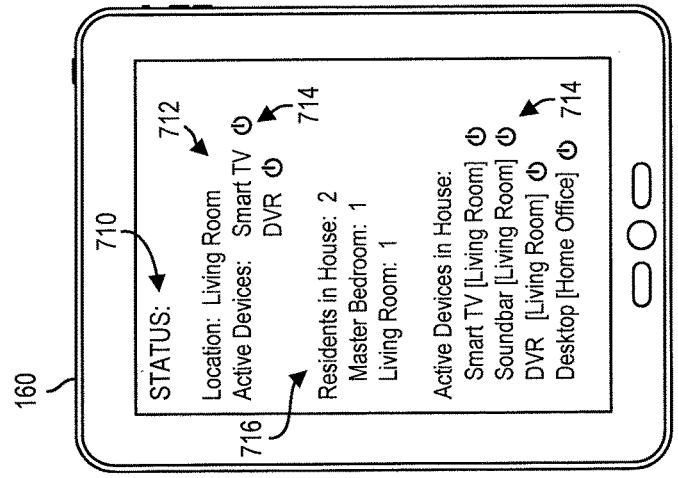
FIGS. 7A-7C are illustrative embodiments of notifications that may be transmitted by the power management device of FIG. 1 to the mobile computing device.
Figure 7B:
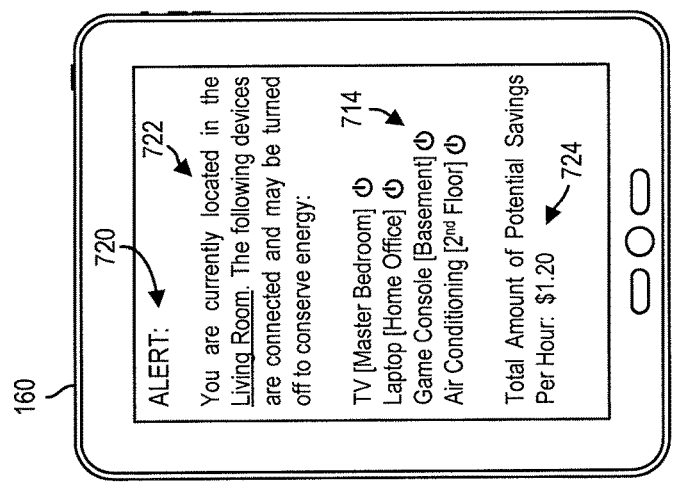
Figure 7C:
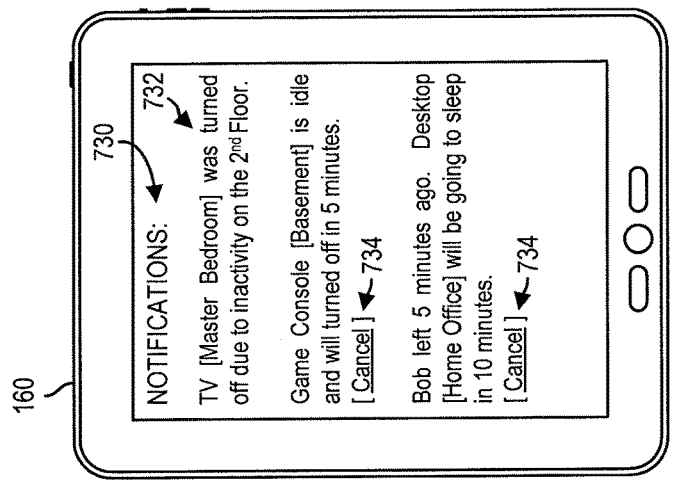

In some embodiments, the power management controller module 212 may also be configured to transmit notifications to the computing device(s) 150 and/or the mobile computing device 160. The transmitted notifications may include global (e.g. system-wide) power status information (e.g., the global status information 710 of FIG. 7A), power consumption alert(s) (e.g., the alert 720 of FIG. 7B), and/or event notification information (e.g., the event notifications 730 of FIG. 7C). To do so, the power management controller module 212 may include the notification module 218. In some embodiments, the notification module 218 may be configured to generate the notifications (e.g., the global status information, the alert(s), the event notifications, etc.) based at least in part on, or otherwise as a function of, the local power status data received from each of the one or more computing devices 150. The generated notifications may then be transmitted to the computing device(s) 150 and/or the mobile computing device 160 by the notification module 218.

In some embodiments, the notification module 218 may be configured to determine a computing device 150 of the one or more computing devices 150 located closest to the user. To do so, the notification module 218 may analyze the context associated with the user to determine which computing device 150 is closest (e.g., nearest) to the user. As discussed, the context data 124 may be received directly from the context sensor(s) 152 and/or received from one or more computing devices 150 including the context sensor(s) 152. Thereafter, the notification module 218 may transmit the generated notifications to the computing device 150 determined to be closest to the user. It should be appreciated that notification module 218 may also transmit the generated notifications to the mobile computing device 160 determined to be closest to the user in embodiments wherein multiple mobile computing devices 160 exist.

Figure 3:
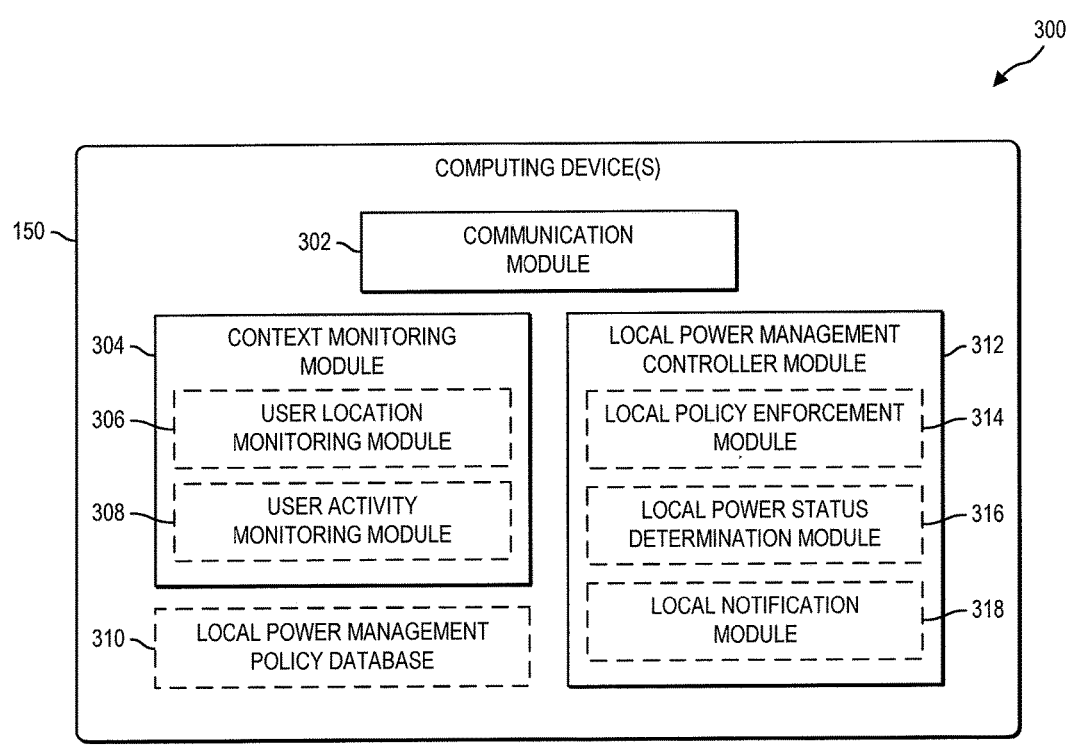
FIG. 3 is a simplified block diagram of at least one embodiment of an environment of the computing device(s) of FIG. 1.

Referring now to FIG. 3, in use, each of the computing devices 150 establishes an environment 300 during operation. The illustrative environment 300 includes a communication module 302, a context monitoring module 304, and a local power management controller module 312. In some embodiments, each of the computing device(s) 150 may also include a local power management policy database 310. As discussed in more detail below, the context monitoring module 304 may include a user location monitoring module 306 and a user activity monitoring module 308. Additionally, in some embodiments, the local power management controller module 312 may also include a local policy enforcement module 314, a local power status determination module 316, and a local notification module 318. Each of the modules 302, 304, 306, 308, 310, 312, 314, 316, and 318 of the environment 300 may be embodied as hardware, software, firmware, or a combination thereof. It should be appreciated that computing device(s) 150 may include other components, sub-components, modules, and devices commonly found in a computing device, which are not illustrated in FIG. 3 for clarity of the description. It should be further appreciated that while each of the computing devices 150 may establish the environment 300 during operation, only a single computing device 150 has been discussed below for clarity of the description.

The communication module 302 of the computing device 150 facilitates communications between components or sub-components of the computing device 150 and the power management device 110 and/or the mobile computing device 160. For example, in some embodiments, the communication module 302 may facilitate sending (e.g., transmitting) local power status data and/or context data 124 associated with the user to the power management device 110. In some embodiments, the communication module 302 may also facilitate receiving one or more notifications (e.g., global power status data, power management alert(s), power management notification(s), etc.) and/or power control instructions from the power management device 110 and/or the mobile computing device 160.

The context monitoring module 304 is configured to monitor the context of the user(s) of the computing device 150. To do so, the context monitoring module 304 may monitor the context data 124 captured by the one or more context sensors 152. In some embodiments, the context monitoring module 304 may include the user location monitoring module 306. The user location monitoring module 306 may monitor context data 124 indicative of the current location (e.g., a room, floor, area, etc.) of the user(s) within the building 102. In some embodiments, the user location monitoring module 306 may be configured to format and/or aggregate the context data 124 indicative of the current location of the user(s) prior to transmission to the power management device 110.

The context monitoring module 304 may also include the user activity monitoring module 308 in some embodiments. The user activity monitoring module 308 may monitor context data 124 indicative of the current activity of the user(s) (e.g., watching television, taking a nap, interacting with one or more of the computing devices 150, talking on the phone, reading a book, etc.). In some embodiments, the user activity monitoring module 308 may be configured to format and/or aggregate the context data 124 indicative of the current activity of the user(s) prior to transmission to the power management device 110.

As discussed, in some embodiments, the computing device 150 may include a local power management policy database 310. The local power management policy database 310 may include one or more local power management policies that define local (e.g., device-specific) power consumption goals and/or targets to be achieved by the computing device 150. Each local power management policy may include local power management rules that may be used by the computing device 150 to adjust its own power consumption level. In some embodiments, the computing device 150 may update its local power management policy database 310 and/or the local power management policies and rules included therein based on a power management policy update received from the power management device 110.

The local power management controller module 312 is configured to control the power consumption level of the computing device 150 based on power consumption instruction(s) received from the power management device 110. To do so, the local power management controller module 312 may include the local policy enforcement module 314. The local policy enforcement module 314 may be configured to receive a power control instruction from the power management device 110. For example, the local policy enforcement module 314 may receive a shutdown instruction (e.g., an instruction to cause the computing device 150 to shut down and/or power down), a boot instruction (e.g., an instruction to cause the computing device 150 to boot and/or power up), a wake instruction (e.g., an instruction to cause the computing device 150 to wake up from a sleep state), a sleep or hibernate instruction (e.g., an instruction to cause the computing device 150 to go to sleep and/or hibernate), a processor clock rate control instruction (e.g., an instruction to cause the computing device 150 to increase and/or decrease processor frequency), and/or a processor core control instruction (e.g., an instruction to cause the computing device 150 to enable and/or disable one or more processor cores) from the power management device 110. In such embodiments, the local policy enforcement module 314 may execute the received power control instruction and thereby adjust the current power consumption level of the computing device 150. It should be appreciated that the local policy enforcement module 314 may receive any other type of power control instruction from the power management device 110.

Additionally or alternatively, the local policy enforcement module 314 may receive a power management policy update from the power management device 110. The power management policy update may include one or more updated power management rules that define a revised power consumption level for the computing device 150. The local policy enforcement module 314 may implement the received power management policy update (e.g., apply the power management policy update to the local power management policies of the local power management policy database 310).

The local power management controller module 312 is also configured to determine the local power status of the computing device 150. To do so, in some embodiments, the local power management controller module 312 includes the local power status determination module 316. In such embodiments, the local power status determination module 316 may be configured to determine a current power consumption level and/or a current power state (e.g., powered-on, powered-off, sleeping, hibernating, waking, booting, suspended, etc.) for the computing device 150.

In some embodiments, the local power management controller module 312 may also be configured to present notifications received from the power management device 110 to user(s) of the computing device 150. To do so, the local power management controller module 312 may include the local notification module 318, which may be configured to present the received notifications to the user(s) of the computing device 150. The received notifications may include global (e.g. system-wide) power status information (e.g., the global status information 710 of FIG. 7A), power consumption alert(s) (e.g., the alert 720 of FIG. 7B), and/or general event notification information (e.g., the event notifications 730 of FIG. 7C) received from the power management device 110.

Figure 4:
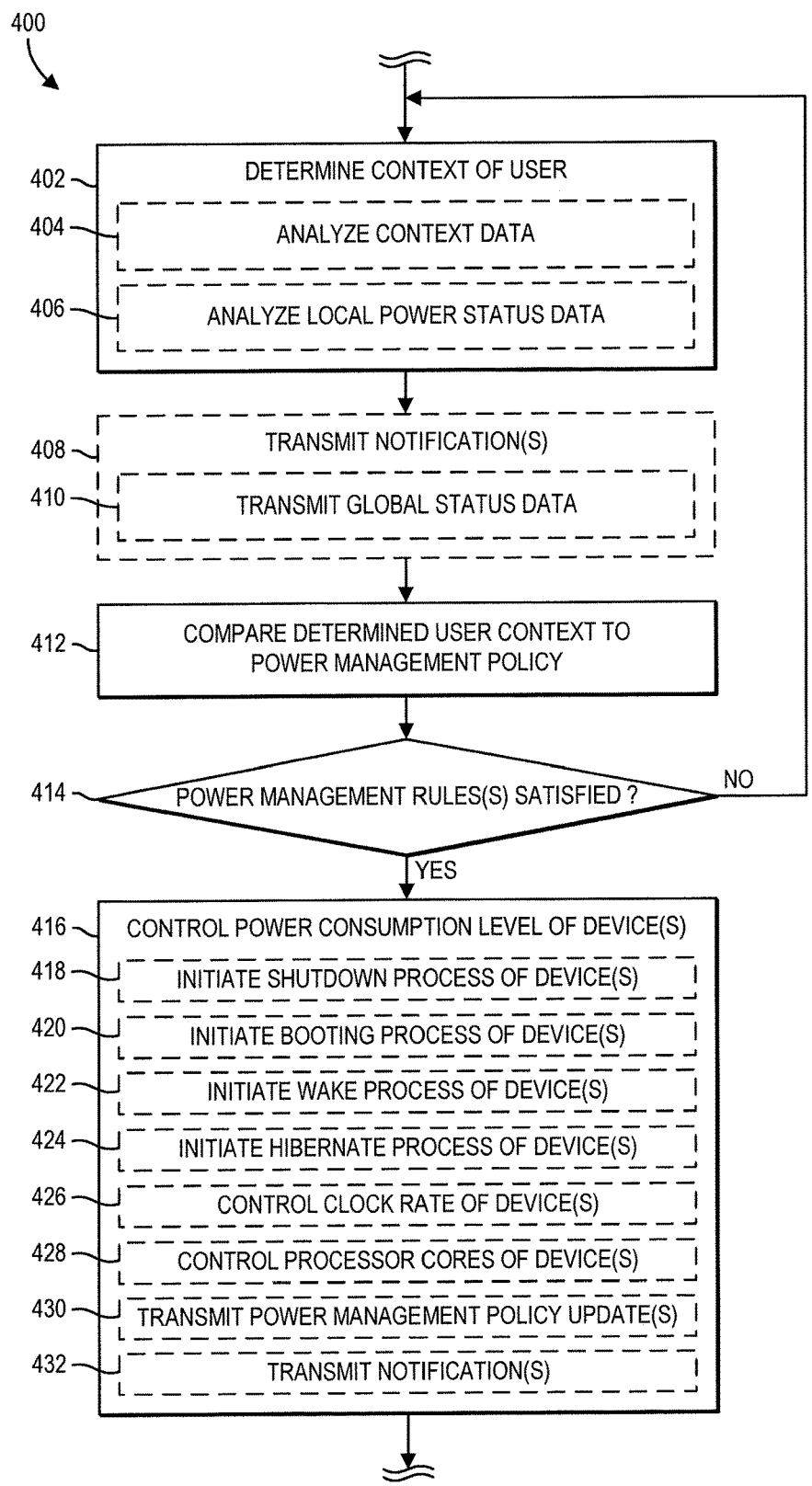
FIG. 4 is a simplified flow diagram of at least one embodiment of a method that may be executed by the power management device of FIG. 1 for managing power consumption levels of the computing device(s)

Referring now to FIG. 4, the power management device 110 may execute a method 400 for managing power consumption levels of the computing device(s) 150. The method 400 begins with block 402 in which a context associated with the user(s) of the computing device(s) 150 is determined. To do so, in block 404, the power management device 110 may analyze context data 124 captured by the context sensor(s) 152. In some embodiments, the power management device 110 receives the context data 124 directly from the context sensor(s) 152. Additionally or alternatively, the power management device 110 receives the context data 124 from one or more of the computing devices 150 that include the context sensor(s) 152. In some embodiments, the received context data 124 includes location data indicative of the current location (e.g., a room, area, section, floor, etc.) of the user(s) within the building 102. Additionally or alternatively, the context data 124 may also include user activity data indicative of the current activity of the user(s) (e.g., watching television, taking a nap, interacting with one or more of the computing devices 150, talking on the phone, reading a book, etc.). The received context data 124 may also include user presence data indicative of a length of time (e.g., 10 minutes, 20 minutes, 1 hour, 1 day, etc.) a user was last detected in a proximity to a computing device 150 of the one or more computing devices 150 (e.g., within a reference distance to the computing device 150), user-reported location data indicative of a user-reported location within the building 102, and/or user interaction data indicative of a last interaction of the user with the computing device 150 of the one or more computing devices 150. It should be appreciated that any other type of context data 124 may also be received. Regardless of the specific type of context data 124 received, the context data 124 may be analyzed by the power management device 110 and a context associated with the user(s) may be determined therefrom.

It should be appreciated that the power management device 110 may analyze the context data 124 received from each of the computing device(s) 150 separately or in aggregate to determine the context associated with the user(s). For example, in some embodiments, the power management device 110 may receive context data 124 indicative of the location of a user (e.g., located within the family room of a house) from one computing device 150 (e.g., a set-top box) as well as context data 124 indicative of the current activity of the user (e.g., the user is napping) from another computing device 150 (e.g., a smart television). Based on the individual context data 124 received from each of the two computing devices 150 (e.g., the smart television and the set-top box), the power management device 110 may determine a combined context associated with the user (e.g., the user is napping in the family room). Of course, it should be appreciated that any other context of the user(s) of the computing device(s) 150 may be determined by the power management device 110. Additionally or alternatively, in some embodiments, the power management device 110 analyzes, in block 406, the local power status data (e.g., a current power consumption level and/or power state) received from each of the computing device(s) 150. In such embodiments, the power management device 110 uses the local power status data to facilitate determining the context associated with the user(s).

In some embodiments, in block 408, the power management device 110 transmits one or more notifications (e.g., the notifications 710, 720, 730 of FIGS. 7A-7C) to the computing device(s) 150 and/or the mobile computing device 160. For example, in block 410, the power management device 110 may transmit a notification that includes global (e.g. system-wide) power status data (e.g., the global status information 710 of FIG. 7A) to the user's mobile computing device 160. As illustratively shown in FIG. 7A, the global status information 710 transmitted to the mobile computing device 160 may include current location information 712 indicative of the computing device(s) 150 currently active within the same location as (e.g., within a reference distance from) the mobile computing device 160. The global status information 710 may also include system-wide statistics 716. In some embodiments, the system-wide statistics 716 include information indicative of a total number of users located within the building 102 and/or a total number of users located within each location (e.g., a room, area, section, floor, etc.) of the building 102. Additionally or alternatively, the system-wide statistics 716 may include a listing of each of the computing device(s) 150 currently active within building 102. Such listing may include the identity and location of the each active computing device 150 within the building 102. In some embodiments, the global status information 710 may also include one or more graphical and/or text-based controls 714 to enable the user to turn off or otherwise place one or more of the computing devices 150 in a "power savings mode" (e.g., sleep, hibernate, etc.).

Referring back to FIG. 4, in block 412, the power management device 110 compares the context associated with the user to one or more power management policies. Each power management policy may include one or more power management rules that define a power consumption level for one or more of the computing devices 150 based on the context associated with the user(s). For example, a power management policy may include a power management rule specifying that the power consumption level of one or more of the computing devices 150 should be adjusted in response to the user(s) being located within a particular room of the building 102. Another power management rule may specify that the power consumption level of a computing device 150 should be adjusted in response to the user(s) not interacting with the computing device 150 within a reference time period (e.g., 10 minutes of inactivity, 20 minutes of inactivity, etc.). Other power management rules may require the power management device 110 to adjust the power consumption level of one or more of the computing devices 150 based on, or otherwise as a function of, the determined activity of the user(s) and/or historical context data associated with the user(s). As a concrete example, another power management rule may specify that a computing device 150 should be powered off or otherwise placed in a "power savings mode" (e.g., sleep, hibernate, etc.) in response to determining that a user is no longer located in the same room as the computing device 150. In another concrete example, a different power management rule may require a computing device 150 to be placed a sleep mode or a hibernate mode based on a determination that a user located in proximity to the computing device 150 is currently sleeping.

In block 414, the power management device 110 determines whether the current context of the user(s) satisfies one or more of the power management rules. If, in block 414, the power management device 110 determines that the current context associated with the user(s) satisfies at least one of the power management rules, the method 400 advances to block 416. If, however, the power management device 110 determines instead that the current context associated with the user(s) does not satisfy at least one of the power management rules, the method 400 loops back to block 402 in which the current context associated with the user(s) is determined.

In block 416, the power management device 110 controls (e.g., adjusts) the power consumption level of one or more of the computing devices 150. To do so, in some embodiments, the power management device 110 transmits one or more power control instructions to the computing device(s) 150 for subsequent execution and/or implementation. For example, the power management device 110 may transmit a shutdown instruction 418 (e.g., an instruction to cause initiation of a shutdown or power down process on the computing device(s) 150), a boot instruction 420 (e.g., an instruction to cause initiation of a boot and/or power up process on the computing device(s) 150), a wake instruction 422 (e.g., an instruction to cause initiation of a process to wake up the computing device(s) 150 from a sleep state), a sleep or hibernate instruction 424 (e.g., an instruction to cause initiation of a process to place the computing device(s) 150 to sleep and/or in a hibernate state), a processor clock rate control instruction 426 (e.g., an instruction to cause initiation of a process to increase and/or decrease the processor frequency of the computing device(s) 150), and/or a processor core control instruction 428 (e.g., an instruction to cause initiation of a process to enable and/or disable one or more processor cores of the computing device(s) 150) to the computing device(s) 150.

Additionally or alternatively, in block 430, the power management device 110 transmits a power management policy update to one or more of the computing devices 150 to control (e.g., adjust) the power consumption level. The power management policy update may include an updated power management rule that defines a revised power consumption level for the computing device(s) 150. The computing devices 150 may subsequently implement the received power management policy update (e.g., apply the power management policy update to the local power management policies of the local power management policy database 310) to effect the revised power consumption level. It should be appreciated that in some embodiments, the power management device 110 transmits a power control instruction and/or a power management policy update only to those computing device(s) 150 requiring a power consumption level adjustment. In that way, the power management device 110 may individually control the power consumption level of each of the computing devices 150 based on the current context of the user(s).

In some embodiments, in block 432, the power management device 110 may also transmit one or more notifications (e.g., the notifications 710, 720, 730 of FIGS. 7A-7C) to the computing device(s) 150 and/or the mobile computing device 160 as a function of adjusting the power consumption level of the computing devices 150. As discussed, in some embodiments, the power management device 110 may transmit a notification that includes global (e.g. system-wide) power status information (e.g., the global status information 710 of FIG. 7A) to the user's mobile computing device 160. Additionally or alternatively, the power management device 110 may transmit a notification that includes a power consumption alert (e.g., the alert 720 of FIG. 7B), and/or general event notification information (e.g., the event notification 730 of FIG. 7C) as a function of adjusting the power consumption level of the computing devices 150. For example, as illustratively shown in FIG. 7B, the power management device 110 may transmit the alert 720 to the user's mobile computing device 160. In some embodiments, the alert 720 may include alert information 722 indicative of the current location of the user, a listing of each of the computing device(s) 150 currently active within the building 102, and/or a total amount of potential power savings 724 for turning off one or more of the active computing devices 150. In some embodiments, the alert 720 may also include one or more graphical and/or text-based controls 714 to enable the user to turn off or otherwise place one or more of the computing devices 150 in a "power savings mode" (e.g., sleep, hibernate, etc.). In another example, as illustratively shown in FIG. 7C, the power management device 110 may transmit the event notification 730 to the user's mobile computing device 160. In some embodiments, the event notification 730 may include event notification information 732 indicative of one or more power consumption level adjustments currently being performed, scheduled to be performed, and/or recently performed by the power management device 110. In such embodiments, the event notification information 732 may include information indicative of the identity and location of each computing device 150 for which a power consumption level adjustment is currently being performed, is scheduled to be performed, and/or was previously performed by the power management device 110. Additionally, the event notification 730 may also include one or more graphical and/or text-based controls 734 to enable the user to cancel or otherwise prevent the power management device 110 from adjusting the power consumption level of one or more of the computing devices 150.

Figure 5:
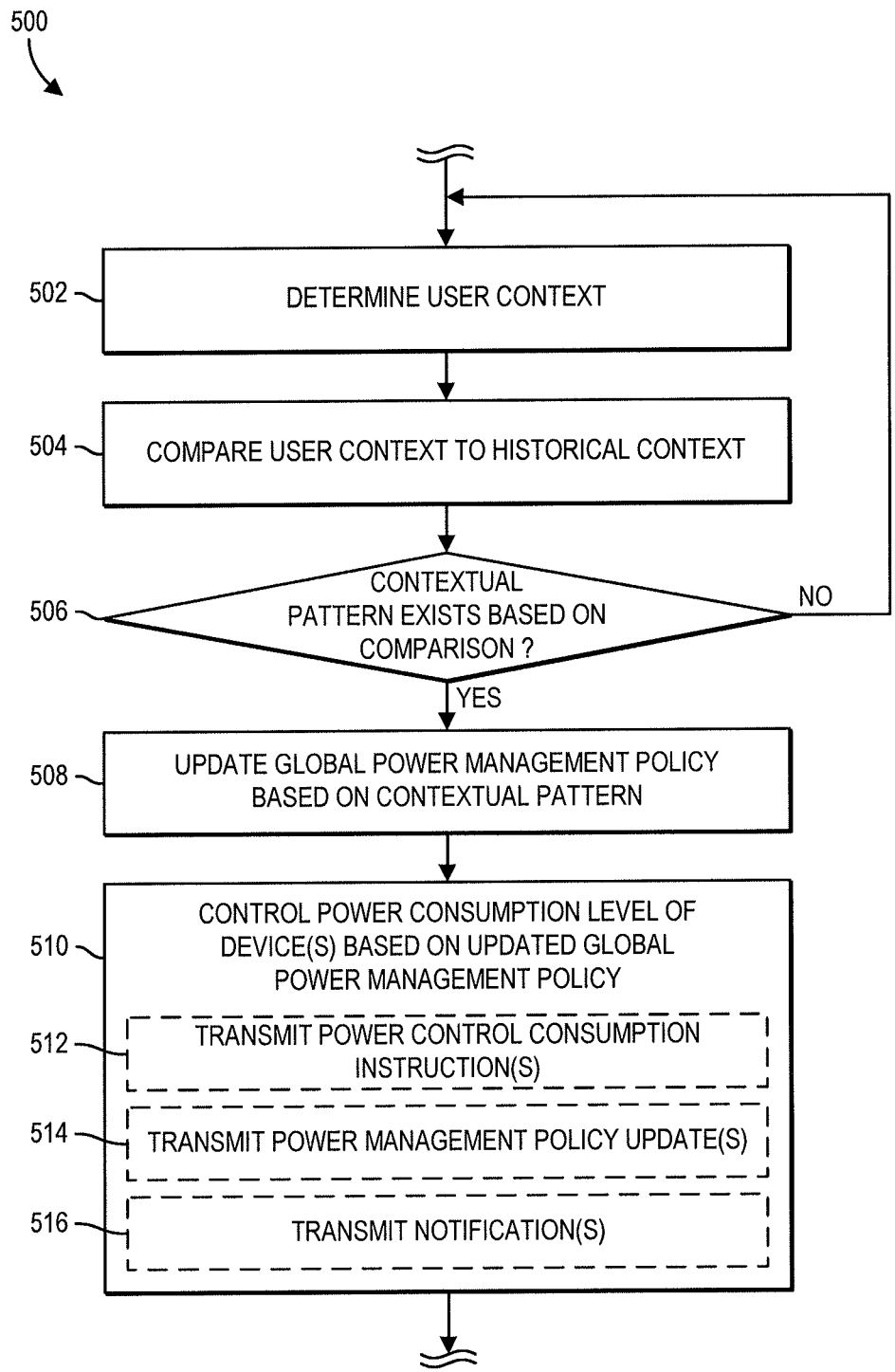
FIG. 5 is a simplified flow diagram of at least one embodiment of a method that may be executed by the power management device of FIG. 1 for managing power consumption levels of the computing device(s) based on contextual patterns.

Referring now to FIG. 5, the power management device 110 may execute a method 500 for managing power consumption levels of the computing device(s) 150 based on contextual patterns. In some embodiments, the method 500 may be executed contemporaneously to or as subroutine of the method 400 of FIG. 4. The method 500 begins with block 502 in which the current context associated with the user(s) of the computing device(s) 150 is determined and/or monitored. To do so, the power management device 110 may analyze context data 124 captured by the context sensor(s) 152. The context data 124 may be indicative of the current location of the user(s), the current activity of the user(s), and/or any other current contextual information associated with the user(s) (e.g., the context data 124 discussed above with reference to block 402 of FIG. 4).

In block 504, the power management device 110 may compare the current context associated with the user(s) with historical context data associated with the user(s). The historical context data may be indicative of a past context associated with the user(s) of the computing device(s) 150. In block 506, the power management device 110 determines whether a contextual pattern exists based on the comparison. The contextual pattern may be embodied as a new contextual pattern and/or a previously existing contextual pattern. For example, in some embodiments, the power management device 110 may determine that the current context associated with the user(s) matches or is otherwise substantially similar to a previously established contextual pattern of the user(s). In other embodiments, the power management device 110 may determine that the current context associated with the user(s) differs from a previously established contextual pattern associated with the user(s). In such embodiments, the power management device 110 updates (e.g., revises, replaces, etc.) the previously established contextual pattern and/or establishes (e.g., generates, creates, etc.) a new contextual pattern based at least in part on, or otherwise as a function of, the differences. If, in block 506, the power management device 110 determines that a contextual pattern exists (e.g., a previously established pattern and/or a newly generated pattern) based on the comparison, the method 500 advances to block 508. If, however, the power management device 110 determines instead that a contextual pattern does not exist, the method 500 returns to block 502 in which the current context of the user(s) is determined and/or monitored.

In block 508, the power management device 110 updates one or more of the global (e.g., system-wide) power management policies based on changes to an existing contextual pattern of the user and/or or generation of a new contextual pattern of the user. For example, in embodiments wherein the power management device 110 determines that the current context of the user(s) differs from a previously established contextual pattern, the power management device 110 updates (e.g., revises, adjusts, etc.) one or more power management policies as a function of the differences. After updating the one or more global power management policies, the method 500 advances to block 510.

In block 510, the power management device 110 controls (e.g., adjusts) the power consumption level of the computing device(s) 150 based on the updated global power management policies. To do so, in some embodiments, the power management device 110 in block 512 transmits one or more power control instructions to the computing device(s) 150 for subsequent execution and/or implementation. For example, the power management device 110 may transmit a shutdown instruction, a boot instruction, a wake instruction, a sleep instruction, a hibernate instruction, a processor clock rate control instruction, and/or a processor core control instruction to the computing device(s) 150 based on the updated global power management policies. Additionally or alternatively, in block 514, the power management device 110 transmits a power management policy update to the computing device(s) 150 based on the updated global power management policies. The power management policy update may include one or more updated power management rules that define a revised power consumption level for the computing device(s) 150. The computing devices 150 may subsequently implement the received power management policy update (e.g., apply the power management policy update to the local power management policies of the local power management policy database 310) to effect the revised power consumption level. In some embodiments, in block 516, the power management device 110 transmits one or more notifications (e.g., the notifications 710, 720, 730 of FIGS. 7A-7C) to the computing device(s) 150 and/or the mobile computing device 160 based on the updated global power management policies.

Figure 6:
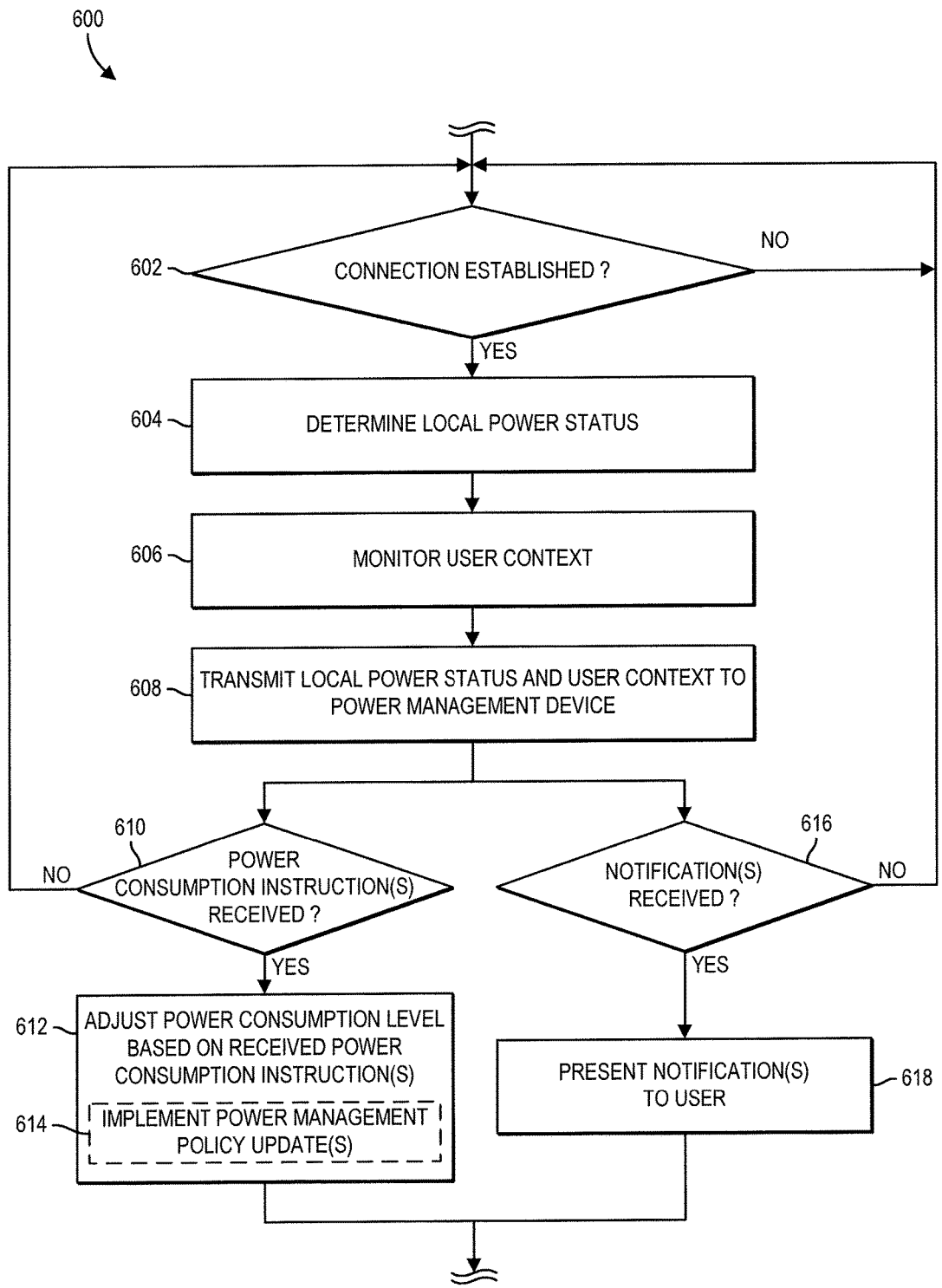
FIG. 6 is a simplified flow diagram of at least one embodiment of a method that may be executed by the computing device(s) of FIG. 1 for adjusting power consumption levels based on power consumption instructions received from the power management device.

Referring now to FIG. 6, the computing device(s) 150 may execute a method 600 for adjusting power consumption levels based on power consumption instructions received from the power management device 110. The method 600 begins with block 602 in which the computing device(s) 150 determine whether a connection is established with the power management device 110. To do so, in some embodiments, the computing device(s) 150 may determine whether an open communication channel exists between the computing device(s) 150 and the power management device 110 via the local network 140 and/or the external network 180. In embodiments wherein the computing device(s) 150 are being initialized (e.g., booting, powering up, etc.), the computing device(s) 150 may attempt to open a communication channel with the power management device 110 via the local network 140 and/or the external network 180. If, in block 602, the computing device(s) 150 determine that a communication channel is established with the power management device 110, the method 600 advances to block 604. If, however, the computing device(s) 150 determine instead that a communication channel is not established with the power management device 110, the method 600 starts over in block 602.

In block 604, the computing device(s) 150 determine a local power status. The local power status for each of the computing devices 150 may be indicative of a current power consumption level and/or a current power state (e.g., powered-on, powered-off, sleeping, hibernating, waking, booting, suspended, etc.) of the computing device 150. It should be appreciated that the local power status may also include any other type of information indicative of the current power consumption and/or operating conditions of the computing device(s) 150.

In block 606, the computing device(s) 150 monitor the context of the user(s). To do so, the computing device(s) 150 may monitor the context data 124 captured by the context sensor(s) 152. In some embodiments, the monitored context data 124 is indicative of the current location (e.g., a room, floor, area, etc.) of the user(s) within the building 102. Additionally or alternatively, the monitored context data 124 is indicative of the current activity of the user(s) (e.g., watching television, taking a nap, interacting with one or more of the computing devices 150, talking on the phone, reading a book, etc.). In some embodiments, the computing device(s) 150 format and/or aggregate the monitored context data 124 indicative of the current location and/or activity of the user(s) prior to transmission to the power management device 110.

Subsequently, in block 608, the computing device(s) 150 transmit the context data 124 to the power management device 110. In some embodiments, the computing device(s) 150 also transmit their determined local power status to the power management device 110. The method 600 then advances to blocks 610 and 616. It should be appreciated that although block 610 and 612 are shown as being executed in parallel by the computing device(s) 150 in the illustrative embodiments, blocks 610 and 616 may instead be executed sequentially in either order by the computing device(s) 150 in other embodiments.

In block 610, the computing device(s) determine whether a power consumption instruction is received from the power management device 110. The power consumption instruction may include a power control instruction and/or a power management policy update. In embodiments wherein the power consumption instruction includes a power control instruction, the power control instruction may be embodied as a shutdown instruction, a boot instruction, a wake instruction, a sleep instruction, a hibernate instruction, a processor clock rate control instruction, and/or a processor core control instruction. In embodiments wherein the power consumption instruction includes a power management policy update, the power management policy update may include one or more updated power management rules that define a revised power consumption level for the computing device(s) 150. If, in block 610, the computing device(s) 150 determine that a power consumption instruction has been received from the power management device 110, the method 600 advances to block 612. If, however, the computing device(s) 150 determine instead that a power consumption instruction has not been received from the power management device 110, the method 600 returns to block 602 to determine whether a connection is established with the power management device 110.

In block 612, the computing device(s) 150 adjust (e.g., increase, decrease, etc.) their power consumption levels based on power consumption instruction(s) received from the power management device 110. To do so, the computing device(s) 150 may execute or implement the received power consumption instruction(s). In embodiments wherein the computing device(s) 150 receive a power management policy update from the power management device 110, the computing device(s) 150 may implement in block 614 the received power management policy update (e.g., apply the power management policy update to the local power management policies of the local power management policy database 310) to effect the revised power consumption level.

In block 616, the computing device(s) 150 determine whether one or more notifications have been received from the power management device 110. For example, the computing device(s) 150 may determine whether a notification including global (e.g. system-wide) power status information (e.g., the global status information 710 of FIG. 7A), power consumption alert(s) (e.g., the alert 720 of FIG. 7B), and/or general event notification information (e.g., the event notifications 730 of FIG. 7C) is received from the power management device 110. If, in block 616, the computing device(s) 150 determine that a notification is received from the power management device 110, the method 600 advances to block 618 in which the notification is presented to the user(s) (e.g., via a display of the computing device(s) 150). If, however, the computing device(s) 150 determine instead that a notification is not received from the power management device 110, the method 600 returns to block 602 to determine whether a connection is established with the power management device 110.

EXAMPLES

Illustrative examples of the technologies disclosed herein are provided below. An embodiment of the technologies may include any one or more, and any combination of, the examples described below.

Example 1 includes a power management device to manage computing device power consumption, the power management device including a context determination module to determine a context associated with a user of one or more computing devices of a plurality of computing devices located within a building, the power management device is communicatively coupled to each computing device via an associated network; and a power management controller module to: (i) compare the context associated with the user to a power management policy, the power management policy includes one or more power management rules that define a power consumption level for the one or more computing devices based on the context associated with the user, and (ii) communicate with the one or more computing devices to adjust the power consumption level of the one or more computing devices in response to satisfaction of one or more power management rules by the context associated with the user.

Example 2 includes the subject matter of Example 1, and wherein the context determination module is further to receive user context data from one or more of the computing devices; and wherein to determine the context associated with the user includes to determine at least one of a location of the user or an activity of the user based on the received user context data.

Example 3 includes the subject matter of any of Examples 1 and 2, and wherein the received user context data includes at least one of user presence data indicative of a time the user was last detected in a proximity to a computing device of the one or more computing devices, location data indicative of the location of the user within the building, user location data indicative of a user-reported location within the building, or user interaction data indicative of a last interaction of the user with the computing device of the one or more computing devices.

Example 4 includes the subject matter of any of Examples 1-3, and wherein the one or more power management rules include at least one of a first power management rule to adjust the power consumption level of the one or more computing devices in response to a determination that the user is located within a particular room of the building, a second power management rule to adjust the power consumption level of the one or more computing devices in response to a determination of no interaction by the user with the one or more computing devices within a reference time period, a third power management rule to adjust the power consumption level of the one or more computing devices in response to the determined activity of the user, or a fourth power management rule to adjust the power consumption level of the one or more computing devices based on historical context data associated with the user.

Example 5 includes the subject matter of any of Examples 1-4, and wherein to communicate with the one or more computing devices to adjust the power consumption level includes to transmit a power control instruction to one or more of the computing devices.

Example 6 includes the subject matter of any of Examples 1-5, and wherein the power control instruction includes at least one of a shutdown instruction, a boot instruction, a wake instruction, a sleep instruction, a hibernate instruction, a processor clock rate control instruction, or a processor core control instruction.

Example 7 includes the subject matter of any of Examples 1-6, and wherein to communicate with the one or more computing devices to adjust the power consumption level includes to transmit a power management policy update to the one or more computing devices, the power management policy update to update local power management policies of the one or more computing devices.

Example 8 includes the subject matter of any of Examples 1-7, and wherein the power management controller module is further to transmit a notification to the one or more computing devices.

Example 9 includes the subject matter of any of Examples 1-8, and wherein to transmit the notification includes to transmit global power status data to the one or more computing devices, the global power status data includes at least one of an identity and a location of each active computing device of the one or more computing devices, a total number of users located in the building, or a total number of users located in each room of the building.

Example 10 includes the subject matter of any of Examples 1-9, and wherein to transmit the notification includes to transmit an alert to the one or more computing devices, the alert includes at least one of an identity and a location of each active computing device of the one or more computing devices located in another room of the building, a current location of the one or more computing devices, or total amount of potential power savings for turning off one or more of the computing devices.

Example 11 includes the subject matter of any of Examples 1-10, and wherein to transmit the notification includes to transmit general notification data to the one or more computing devices, the general notification data includes at least one of an identity and a location of each computing device of the one or more computing devices turned off or the identity and location of each computing device scheduled to be turned off.

Example 12 includes the subject matter of any of Examples 1-11, and wherein the power management controller module is further to determine a computing device of the one or more computing devices located closest to the user; and wherein to transmit the notification includes to transmit the notification to the computing device determined to be closest to the user.

Example 13 includes the subject matter of any of Examples 1-12, and wherein the power management controller module is further to transmit a notification to a mobile computing device.

Example 14 includes the subject matter of any of Examples 1-13, and wherein the power management controller module is further to receive local power status data from each of the one or more computing devices, the local power status data includes a current power consumption level for a corresponding computing device.

Example 15 includes the subject matter of any of Examples 1-14, and wherein the context determination module is further to: (i) compare the context associated with the user to historical context data associated with the user, and (ii) determine whether a contextual pattern exists based on the comparison; and wherein the power management controller module is further to: (i) update the power management policy based on the determined contextual pattern, and (ii) transmit one or more of a power control instruction, a power management policy update, or a notification to one or more of the computing devices based on the updated power management policy.

Example 16 includes a method for managing computing device power consumption, the method including determining, by a power management device, a context associated with a user of one or more computing devices of a plurality of computing devices located within a building, the power management device communicatively coupled to each computing device via an associated network; comparing, by the power management device, the context associated with the user to a power management policy, the power management policy includes one or more power management rules that define a power consumption level for the one or more computing devices based on the context associated with the user; and communicating, by the power management device, with the one or more computing devices to adjust the power consumption level of the one or more computing devices in response to the context associated with the user satisfying one or more power management rules.

Example 17 includes the subject matter of Example 16, and further including receiving, by the power management device, user context data from one or more of the computing devices; and wherein determining the context associated with the user includes determining at least one of a location of the user or an activity of the user based on the received user context data.

Example 18 includes the subject matter of any of Examples 16 and 17, and wherein the received user context data includes at least one of user presence data indicative of a time the user was last detected in a proximity to a computing device of the one or more computing devices, location data indicative of the location of the user within the building, user location data indicative of a user-reported location within the building, or user interaction data indicative of a last interaction of the user with the computing device of the one or more computing devices.

Example 19 includes the subject matter of any of Examples 16-18, and wherein the one or more power management rules include at least one of a first power management rule to adjust the power consumption level of the one or more computing devices in response to the user being located within a particular room of the building, a second power management rule to adjust the power consumption level of the one or more computing devices in response to the user not interacting with the one or more computing devices within a reference time period, a third power management rule to adjust the power consumption level of the one or more computing devices in response to the determined activity of the user, or a fourth power management rule to adjust the power consumption level of the one or more computing devices based on historical context data associated with the user.

Example 20 includes the subject matter of any of Examples 16-19, and wherein communicating with the one or more computing devices to adjust the power consumption level includes transmitting a power control instruction to one or more of the computing devices.

Example 21 includes the subject matter of any of Examples 16-20, and wherein the power control instruction includes at least one of a shutdown instruction, a boot instruction, a wake instruction, a sleep instruction, a hibernate instruction, a processor clock rate control instruction, or a processor core control instruction.

Example 22 includes the subject matter of any of Examples 16-21, and wherein communicating with the one or more computing devices to adjust the power consumption level includes transmitting a power management policy update to the one or more computing devices, the power management policy update for updating local power management policies of the one or more computing devices.

Example 23 includes the subject matter of any of Examples 16-22, and further including transmitting, by the power management device, a notification to the one or more computing devices.

Example 24 includes the subject matter of any of Examples 16-23, and wherein transmitting the notification includes transmitting global power status data to the one or more computing devices, the global power status data includes at least one of an identity and a location of each active computing device of the one or more computing devices, a total number of users located in the building, or a total number of users located in each room of the building.

Example 25 includes the subject matter of any of Examples 16-24, and wherein transmitting the notification includes transmitting an alert to the one or more computing devices, the alert includes at least one of an identity and a location of each active computing device of the one or more computing devices located in another room of the building, a current location of the one or more computing devices, or total amount of potential power savings for turning off one or more of the computing devices.

Example 26 includes the subject matter of any of Examples 16-25, and wherein transmitting the notification includes transmitting general notification data to the one or more computing devices, the general notification data includes at least one of an identity and a location of each computing device of the one or more computing devices turned off or the identity and location of each computing device scheduled to be turned off.

Example 27 includes the subject matter of any of Examples 16-26, and further including determining, by the power management device, a computing device of the one or more computing devices located closest to the user; and wherein transmitting the notification includes transmitting the notification to the computing device determined to be closest to the user.

Example 28 includes the subject matter of any of Examples 16-27, and further including transmitting, by the power management device, a notification to a mobile computing device.

Example 29 includes the subject matter of any of Examples 16-28, and further including receiving, by the power management device, local power status data from each of the one or more computing devices, the local power status data includes a current power consumption level for a corresponding computing device.

Example 30 includes the subject matter of any of Examples 16-29, and further including comparing, by the power management device, the context associated with the user to historical context data associated with the user; determining, by the power management device, whether a contextual pattern exists based on the comparison; updating, by the power management device, the power management policy based on the determined contextual pattern; and transmitting, by the power management device, one or more of a power control instruction, a power management policy update, or a notification to one or more of the computing devices based on the updated power management policy.

Example 31 includes a power management device to manage computing device power consumption, the power management device including a processor; and a memory having stored therein a plurality of instructions that when executed by the processor cause the power management device to perform the method of any of Examples 16-30.

Example 32 includes one or more machine-readable media including a plurality of instructions stored thereon that in response to being executed result in a power management device performing the method of any of Examples 16-30.

Example 33 includes a power management device to manage computing device power consumption, the power management device including means for performing the method of any of Examples 16-30.

Example 34 includes a computing device to adjust power consumption, the computing device including a context monitoring module to monitor a context associated with a user of the computing device; and a power management controller module to: (i) determine whether a connection to a power management device is established via an associated network, (ii) determine a local power status of the computing device, and (iii) transmit the local power status and the context associated with the user to the power management device.

Example 35 includes the subject matter of Example 34, and wherein the power management controller module is further to receive a power control instruction from the power management device; and execute the received power control instruction to adjust the power consumption level of the computing device.

Example 36 includes the subject matter of any of Examples 34 and 35, and wherein the received power control instruction includes at least one of a shutdown instruction, a boot instruction, a wake instruction, a sleep instruction, a hibernate instruction, a processor clock rate control instruction, or a processor core control instruction.

Example 37 includes the subject matter of any of Examples 34-36, and wherein the power management controller module is further to receive a power management policy update from the power management device; and implement the received power management policy update to adjust the power consumption level of the computing device.

Example 38 includes the subject matter of any of Examples 34-37, and wherein to implement the received power management policy update includes to: (i) apply the power management policy update to a local power management policy of the computing device, and (ii) adjust the power consumption level of the computing device based on the updated local power management policy.

Example 39 includes the subject matter of any of Examples 34-38, and wherein the context monitoring module is further to receive user context data captured by at least one context sensor of the computing device; and wherein to monitor the context associated with the user includes to monitor at least one of a location of the user or an activity of the user based on the received user context data.

Example 40 includes the subject matter of any of Examples 34-39, and wherein the power management controller module is further to receive a notification from the power management device; and present the notification to the user of the computing device.

Example 41 includes a method for adjusting power consumption, the method including determining, by a computing device located within a building whether a connection to a power management device is established via an associated network; determining, by the computing device, a local power status of the computing device; monitoring, by the computing device, a context associated with a user of the computing device; and transmitting, by the computing device, the local power status and the context associated with the user to the power management device.

Example 42 includes the subject matter of Example 41, and further including receiving, by the computing device, a power control instruction from the power management device; and executing, by the computing device, the received power control instruction to adjust the power consumption level of the computing device.

Example 43 includes the subject matter of any of Examples 41 and 42, and wherein the received power control instruction includes at least one of a shutdown instruction, a boot instruction, a wake instruction, a sleep instruction, a hibernate instruction, a processor clock rate control instruction, or a processor core control instruction.

Example 44 includes the subject matter of any of Examples 41-43, and further including receiving, by the computing device, a power management policy update from the power management device; and implementing, by the computing device, the received power management policy update to adjust the power consumption level of the computing device.

Example 45 includes the subject matter of any of Examples 41-44, and wherein implementing the received power management policy update includes: (i) applying the power management policy update to a local power management policy of the computing device, and (ii) adjusting the power consumption level of the computing device based on the updated local power management policy.

Example 46 includes the subject matter of any of Examples 41-45, and further including receiving, by the computing device, user context data captured by at least one context sensor of the computing device; and wherein monitoring the context associated with the user includes monitoring at least one of a location of the user or an activity of the user based on the received user context data.

Example 47 includes the subject matter of any of Examples 41-46, and further including receiving, by the computing device, a notification from the power management device; and presenting, by the computing device, the notification to the user of the computing device.

Example 48 includes a computing device to adjust power consumption, the computing device including a processor; and a memory having stored therein a plurality of instructions that when executed by the processor cause the computing device to perform the method of any of Examples 41-47.

Example 49 includes one or more machine-readable media including a plurality of instructions stored thereon that in response to being executed result in a computing device performing the method of any of Examples 41-47.

Example 50 includes a computing device to adjust power consumption, the computing device including means for performing the method of any of Examples 41-47.

What is claimed is:

1. A power management device to manage computing device power consumption, the power management device comprising:
    a context determination module to determine a context associated with a user of a plurality of computing devices of a group of computing devices located within a building, the power management device is communicatively coupled to each computing device via an associated network; and
    a power management controller module to: (i) compare the context associated with the user to a power management policy, the power management policy comprising one or more power management rules that define a power consumption level for the group of computing devices based on the context associated with the user, (ii) communicate with the group of computing devices to adjust the power consumption level of the group of computing devices in response to satisfaction of one or more power management rules by the context associated with the user, (iii) determine which computing device of the group of computing devices is located closest to the user in response to determination of the context associated with the user, and (iv) transmit a notification to the computing device determined to be closest to the user.

2. The power management device of claim 1, wherein the context determination module is further to receive user context data from one or more of the plurality of computing devices; and
    wherein to determine the context associated with the user comprises to determine an activity of the user based on the received user context data.

3. The power management device of claim 2, wherein to determine the activity of the user based on the received user context data comprises to determine that the user is asleep.

4. The power management device of claim 1, wherein the context determination module is further to receive user context data from one or more of the plurality of computing devices; and
    wherein the received user context data comprises at least one of user presence data indicative of a time the user was last detected in a proximity to a computing device of the group of computing devices.

5. The power management device of claim 1, wherein the context determination module is further to receive user context data from one or more of the plurality of computing devices; and
    wherein the one or more power management rules comprise a power management rule to adjust the power consumption level of the group of computing devices in response to a determination of no interaction by the user with the group of computing devices within a reference time period.

6. The power management device of claim 1, wherein to communicate with the group of computing devices to adjust the power consumption level comprises to transmit a power control instruction to one or more of the plurality of computing devices.

7. The power management device of claim 6, wherein the power control instruction comprises at least one of a shutdown instruction, a boot instruction, a wake instruction, a sleep instruction, a hibernate instruction, a processor clock rate control instruction, or a processor core control instruction.

8. The power management device of claim 1, wherein to communicate with the group of computing devices to adjust the power consumption level comprises to transmit a power management policy update to the group of computing devices, the power management policy update to update local power management policies of the group of computing devices.

9. The power management device of claim 1, wherein to transmit the notification comprises to transmit global power status data to the group of computing devices, the global power status data comprises at least one of an identity and a location of each active computing device of the group of computing devices, a total number of users located in the building, or a total number of users located in each room of the building.

10. The power management device of claim 1, wherein to transmit the notification comprises to transmit an alert to the group of computing devices, the alert comprises at least one of an identity and a location of each active computing device of the group of computing devices located in another room of the building, a current location of the group of computing devices, or total amount of potential power savings for turning off one or more of the plurality of computing devices.

11. The power management device of claim 1, wherein to transmit the notification comprises to transmit general notification data to the group of computing devices, the general notification data comprises at least one of an identity and a location of each computing device of the group of computing devices turned off or the identity and location of each computing device scheduled to be turned off.

12. The power management device of claim 1, wherein the power management controller module is further to transmit a notification to a mobile computing device.

13. The power management device of claim 1, wherein the power management controller module is further to receive local power status data from each of the group of computing devices, the local power status data comprises a current power consumption level for a corresponding computing device.

14. The power management device of claim 1, wherein the context determination module is further to: (i) compare the context associated with the user to historical context data associated with the user, and (ii) determine whether a contextual pattern of user activity exists based on the comparison; and
wherein the power management controller module is further to: (i) update the power management policy based on the determined contextual pattern, and (ii) transmit one or more of a power control instruction, a power management policy update, or a notification to one or more of the plurality of computing devices based on the updated power management policy.

15. The power management device of claim 14,
wherein the context determination module is to determine a second context associated with the user at a later time than the determination of the context,
wherein the context determination module is further to: (i) compare the second context associated with the user to the contextual pattern, (ii) determine whether the contextual pattern should be updated based on the comparison of the second context with the contextual pattern, and (iii) update the contextual pattern based on a determination that the contextual pattern should be updated based on the comparison of the second context with the contextual pattern,
wherein the power management controller module is further to: (i) update the power management policy based on the updated determined contextual pattern.

16. One or more non-transitory machine-readable media comprising a plurality of instructions stored thereon that in response to being executed by a power management device, cause the power management device to:
determine a context associated with a user of group of computing devices of a plurality of computing devices located within a building, the power management device communicatively coupled to each computing device via an associated network;
determine a computing device of the group of computing devices located closest to the user in response to determination of the context associated with the user;
compare the context associated with the user to a power management policy, the power management policy comprising one or more power management rules that define a power consumption level for the group of computing devices based on the context associated with the user;
communicate with the group of computing devices to adjust the power consumption level of the group of computing devices in response to the context associated with the user satisfying one or more power management rules, and
transmit a notification to the computing device determined to be closest to the user.

17. The one or more non-transitory machine-readable media of claim 16, wherein the plurality of instructions further cause the power management device to receive user context data from one or more of the plurality of computing devices; and
wherein to determine the context associated with the user comprises to determine at least an activity of the user based on the received user context data.

18. The one or more non-transitory machine-readable media of claim 16, wherein to communicate with the group of computing devices to adjust the power consumption level comprises to at least one of: (i) transmit a power control instruction to one or more of the plurality of computing devices, or (ii) transmit a power management policy update to the group of computing devices, the power management policy update to update local power management policies of the group of computing devices.

19. The one or more non-transitory machine-readable media of claim 16, wherein the plurality of instructions further cause the power management device to receive local power status data from each of the group of computing devices, the local power status data comprises a current power consumption level for a corresponding computing device.

20. The one or more non-transitory machine-readable media of claim 16, wherein the plurality of instructions further cause the power management device to:
compare the context associated with the user to historical context data associated with the user;
determine whether a contextual pattern exists based on the comparison;
update the power management policy based on the determined contextual pattern; and
transmit one or more of a power control instruction, a power management policy update, or a notification to one or more of the plurality of computing devices based on the updated power management policy.

21. A method for managing computing device power consumption, the method comprising:
determining, by a power management device, a context associated with a user of group of computing devices of a plurality of computing devices located within a building, the power management device communicatively coupled to each computing device via an associated network;
determining, by the power management device, a computing device of the group of computing devices located closest to the user in response to determination of the context associated with the user;
comparing, by the power management device, the context associated with the user to a power management policy, the power management policy comprising one or more power management rules that define a power consumption level for the one or more computing devices based on the context associated with the user;

communicating, by the power management device, with the group of computing devices to adjust the power consumption level of the group of computing devices in response to the context associated with the user satisfying one or more power management rules;

transmitting, by the power management device, a notification to the computing device determined to be closest to the user.

22. The method of claim 21, wherein communicating with the group of computing devices to adjust the power consumption level comprises at least one of: (i) transmitting a power control instruction to one or more of the plurality of computing devices, or (ii) transmitting a power management policy update to the group of computing devices, the power management policy update for updating local power management policies of the group of computing devices.

23. The method of claim 21, further comprising:

comparing, by the power management device, the context associated with the user to historical context data associated with the user;

determining, by the power management device, whether a contextual pattern exists based on the comparison;

updating, by the power management device, the power management policy based on the determined contextual pattern; and transmitting, by the power management device, one or more of a power control instruction, a power management policy update, or a notification to one or more of the plurality of computing devices based on the updated power management policy.

* * * * *